(12) United States Patent
Sugiyama

(10) Patent No.: US 11,119,716 B2
(45) Date of Patent: Sep. 14, 2021

(54) DISPLAY SYSTEM, MACHINE LEARNING DEVICE, AND DISPLAY DEVICE

(71) Applicant: FANUC CORPORATION, Yamanashi (JP)

(72) Inventor: Yuusuke Sugiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/594,079

(22) Filed: Oct. 7, 2019

(65) Prior Publication Data

US 2020/0133609 A1    Apr. 30, 2020

(30) Foreign Application Priority Data

Oct. 31, 2018 (JP) .............................. JP2018-205997
May 20, 2019 (JP) .............................. JP2019-094701

(51) Int. Cl.
*G06F 3/14* (2006.01)
*G06N 5/04* (2006.01)
*G06N 20/00* (2019.01)

(52) U.S. Cl.
CPC ............. *G06F 3/1423* (2013.01); *G06N 5/04* (2013.01); *G06N 20/00* (2019.01)

(58) Field of Classification Search
CPC ......... G06F 3/1423; G06N 5/04; G06N 20/00
See application file for complete search history.

(56) References Cited

U.S. PATENT DOCUMENTS

| 2018/0033130 A1* | 2/2018 | Kimura | G06K 9/4604 |
| 2018/0268224 A1* | 9/2018 | Anami | G06K 9/00335 |
| 2020/0377132 A1* | 12/2020 | Kitajima | B61L 5/06 |

FOREIGN PATENT DOCUMENTS

| JP | 2014-155207 A | 8/2014 |
| JP | 2017-131335 A | 8/2017 |
| JP | 6224873 B1 | 11/2017 |
| JP | 201822210 A | 2/2018 |
| JP | 201855611 A | 4/2018 |
| WO | 2010/143361 A1 | 12/2010 |
| WO | 2017057135 A1 | 4/2017 |
| WO | 2018154709 A1 | 8/2018 |

* cited by examiner

*Primary Examiner* — Alexander Eisen
*Assistant Examiner* — Kebede T Teshome
(74) *Attorney, Agent, or Firm* — Hauptman Ham, LLP

(57) ABSTRACT

A display system includes a state acquisition section which acquires state data, a label acquisition section which acquires label data representing whether or not an operation performed when the state data is acquired is abnormal, a threshold calculation section which calculates, based on the state data and the label data, a threshold for determining whether or not an operation to be performed is likely to become abnormal, a display control section which controls display timing of a normal operation based on the threshold, and a display unit configured to display the normal operation according to the display timing.

12 Claims, 4 Drawing Sheets

DISPLAY SYSTEM, MACHINE LEARNING DEVICE, AND DISPLAY DEVICE

RELATED APPLICATIONS

The present application claims priority of Japanese Application Number 2019-094701, filed May 20, 2019, and Japanese Application Number 2018-205997, filed Oct. 31, 2018, the disclosures of which are hereby incorporated by reference herein in their entirety.

BACKGROUND OF THE INVENTION

1. Field of the Invention

The present invention relates to a display system, a machine learning device, and a display device, and in particular, relates to a display system, machine learning device, and display device for supporting an operation.

2. Description of Related Art

When an operation (such as, for example, an assembly operation, inspection operation, cleaning operation, packing operation, or office work operation) is performed by a person, operation errors such as assembly failures, inspection errors, insufficient cleaning, packing failures, typographical errors, etc., may occur due to operator oversight. Techniques for mitigating operation errors by displaying operation procedures are known.

Japanese Unexamined Patent Publication (Kokai) No. 2014-155207 discloses a head-mounted display device for displaying a character string representing instructions or an image representing contents to be executed by a user, in which a current procedure is estimated by image recognition of an image of surroundings.

Japanese Patent No. 6224873 discloses an information processing system for displaying an instruction image for correction of an operation superimposed on real space when the difference between standard data in which an operation is registered and acquired operation data is equal to or greater than a threshold.

WO 2010/143361 discloses an operation recognition device for identifying the operation of a user using speed sensor output and imaging unit output.

Japanese Unexamined Patent Publication (Kokai) No. 2017-131335 discloses an endoscope cleaning management system that determines operation procedure information to be provided in accordance with the skill level of the operator.

SUMMARY OF THE INVENTION

Operation errors of particularly inexperienced operators can be reduced by displaying normal operation procedures, operation results, etc., prior to operation. However, displaying normal operations is bothersome and disruptive for skilled operators, and reduces operation efficiency. Even for skilled operators, operation errors may occur in cases such as complex operations, operations having a long operation time, work time, the number of working days, etc.

Thus, a technique for controlling display timing of normal operations has been demanded.

An aspect of the present disclosure provides a display system comprising a state acquisition section which acquires state data including at least operation contents, a label acquisition section which acquires label data representing whether or not an operation performed when the state data is acquired is abnormal, a threshold calculation section which calculates, based on the state data and the label data, a threshold for determining whether or not an operation to be performed is likely to become abnormal, a display control section which controls display timing of a normal operation based on the threshold, and one or a plurality of display units configured to display the normal operation according to the display timing.

Another aspect of the present disclosure provides a machine learning device comprising a state acquisition section which acquires state data including at least operation contents, a label acquisition section which acquires label data representing whether or not an operation performed when the state data is acquired is abnormal, and a threshold calculation section which calculates, based on the state data and the label data, a threshold for determining whether or not an operation to be performed is likely to become abnormal, wherein the threshold is updated based on a learning model using the state data and the label data as teaching data.

Yet another aspect of the present disclosure provides a display device comprising a state acquisition section which acquires state data including at least operation contents, a label acquisition section which acquires label data representing whether or not an operation performed when the state data is acquired is abnormal, a threshold calculation section which calculates, based on the state data and the label data, a threshold for determining whether or not an operation to be performed is likely to become abnormal, a display control section which controls display timing of a normal operation based on the threshold, and a display unit configured to display the normal operation according to the display timing.

DETAILED DESCRIPTION

Figure 1:
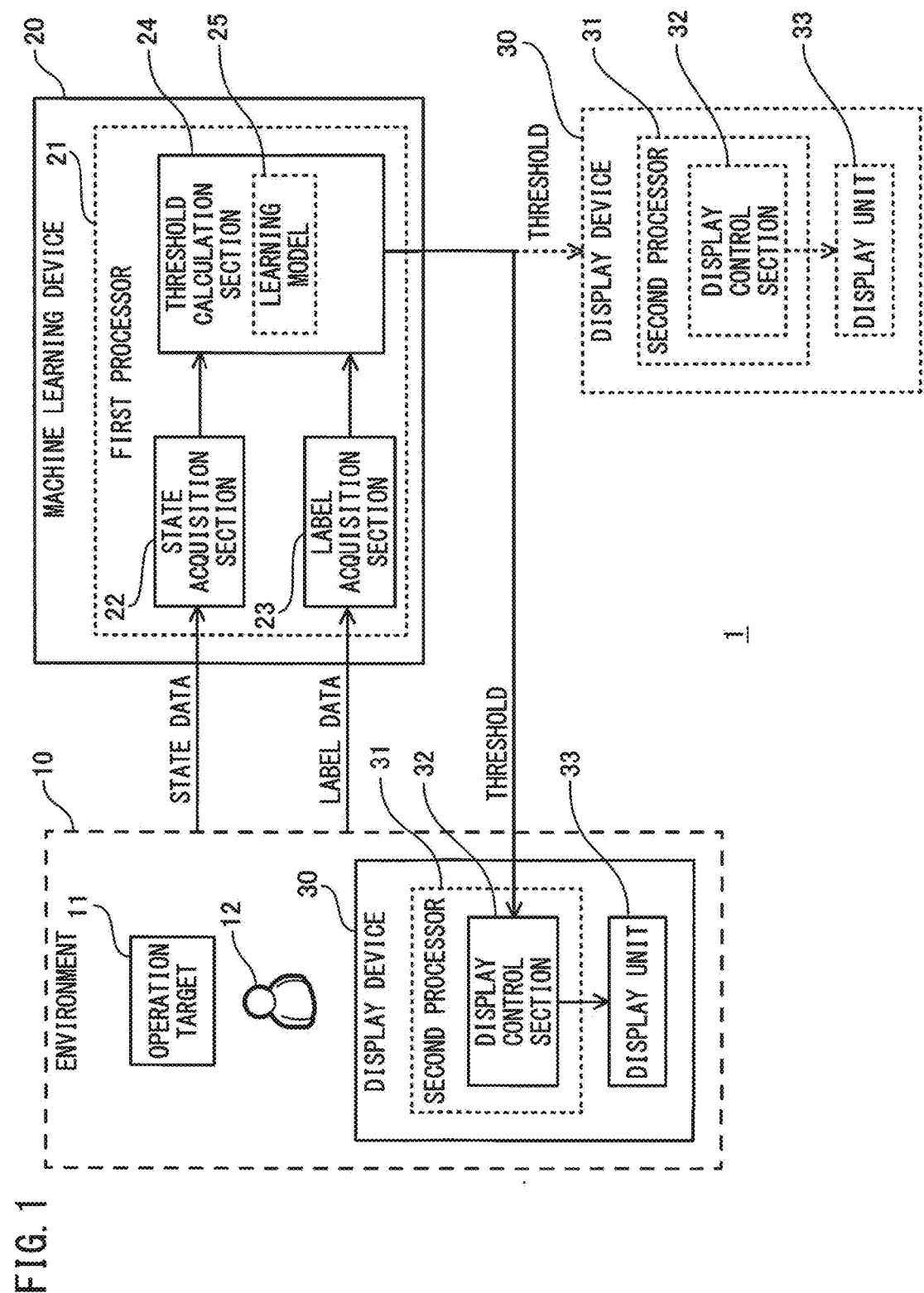
FIG. 1 is a block diagram of the display system according to an embodiment.

The embodiments of the present disclosure will be described in detail below with reference to the attached drawings. In the drawings, the same or similar constituent elements have been assigned the same or similar reference numerals. Furthermore, the embodiments described below do not limit the technical scope of the inventions or the meanings of the terms described in the claims.

FIG. 1 is a block diagram of the display system 1 of the present embodiment. FIG. 1 shows an environment 10 in which operations are performed, an operation target 11 arranged in the environment 10, and an operator 12 who performs a default operation on the operation target 11. The operation includes, for example, an assembly operation, inspection operation, cleaning operation, packing operation, or office work operation. The display system 1 has a function for displaying information for supporting such an operation.

The display system 1 comprises a machine learning device 20 and a display device 30. The machine learning device 20 and the display device 30 are communicably connected via a wired or wireless network, etc. The machine learning device 20 may be constituted as a PC (personal computer), server, or the like. The display device 30 may be constituted as a laptop arranged in the environment 10, a PDA (personal digital assistant), a smartphone, a wearable device, or the like. The display system 1 may comprise a plurality of display devices 30, and in this case, the display devices 30 are arranged in the same environment or in different environments.

The display system 1 may comprise a first processor 21, a second processor 31, and a display unit 33. The first processor 21 and the second processor 31 are constituted as well-known processors such as an ASIC (application specific integrated circuit), FPGA (field programmable gate array), or CPU (central processing unit). The first processor 21 has a function for calculating, based on various information acquired from the environment 10, a threshold for determining whether or not an operation is likely to become abnormal. The second processor 31 has a function for controlling display timing of a normal operation based on the threshold. Furthermore, the second processor 31 may have a function for determining whether or not the operation target 11 is a normal product, a function for displaying defective portions of the operation target 11 and recommending replacement, and a function for determining whether or not the operation was normal.

The machine learning device 20 may comprise the first processor 21. The first processor 21 may comprise a state acquisition section 22, a label acquisition section 23, and a threshold calculation section 24. The state acquisition section 22, the label acquisition section 23, and the threshold calculation section 24 may be constituted as programs which are executable by the CPU. The state acquisition section 22 acquires state data from the environment 10. The state data is data which represents the operation state, and includes at least operation contents. Furthermore, the state data may include at least one of operator information, an operation time length, and an operation date and time. Below, the definitions of the various types of information and the methods of acquisition thereof will be described.

"Operation contents" is defined as information representing the type of operation being performed. For example, the operation contents include an operation type code, operation difficulty level, and the like. The operation contents can be specified using a device such as a camera or a barcode reader. The device may be provided in the display device 30, or may be provided in another location (the same is true for the "devices" described later). The operation contents may be specified based on, for example, the ID or an image of the operation target 11. For example, in the case of an assembly operation in which a component A and a component B are assembled with a component C, the operation contents are specified by matching the three IDs of the components A, B, and C with reference data. Furthermore, the operation contents may be used to determine whether or not the operation was normal.

"Operator information" is defined as information representing the proficiency of the operator 12 performing the operation. For example, the operator information includes an operator ID, the age, years of employment, and years of experience of the operator, etc. The operator information is specified based on, for example, the ID of the operator 12 input when authorization to enter and exit the environment 10 and authority to access the display device 30 is verified.

"Operation time length" is defined as information representing the time interval from the start of the operation until completion of the operation. The operation time length is specified using a device such as, for example, a camera, a barcode reader, or an internal clock. The operation start time may be the time at which the ID of the operation target 11 is acquired, may be the time at which the power source of the display device 30 is activated, or may be the time at which the operator 12 inputs an operation start on the display device 30. The operation end time may be the time at which an image of an operation end indicator applied to the operation target 11 is acquired, may be the time at which the power source of the display device 30 is deactivated, or may be the time at which the operator 12 inputs an operation end on the display device 30.

"Operation date and time" is defined as information representing the date, time, and day of the week when the operation is performed. For example, the operation date and time may be the date and time of the operation start, may be the date and time of the operation end, or may be the date and time of the midpoint between the operation start date and time and the operation end date and time. The operation date and time is specified using a device such as, for example, a camera, a barcode reader, or an internal clock. It is desirable to acquire the operation date and time as state data, since the accuracy of the operation may be lost if the operation time exceeds a certain level, the days of operation exceed a certain level, etc.

The label acquisition section 32 acquires label data from the environment 10. The label data is data representing whether or not an operation performed when the state data is acquired is abnormal. The label data is data representing a correct answer. When the label data indicates a normal operation, the operation was in fact normal, and when the label data indicates an abnormal operation, the operation was in fact abnormal. The label data is specified using a device such as, for example, a camera or a barcode reader. The label data is specified based on, for example, the ID, an image, etc., of the operation target 11. For example, in an assembly operation in which a component A and a component B are connected with wiring D, the label data is specified by comparing the three IDs of component A, component B, and wiring D and an image of the operation target 11 after assembly with reference data.

The threshold calculation section 24 calculates, based on the state data and the label data, a threshold for determining whether or not an operation is likely to become abnormal. The threshold is learned using machine learning, in particular supervised learning. In other words, the threshold is updated based on the learning model 25 using the state data and the label data as teaching data. The learning model 25 may be shared between a plurality of display units 33. Since the threshold is increased or decreased each time the state data and the label data are acquired, the prediction accuracy as to whether or not the operation to be performed is likely to become abnormal improves over time. However, in another embodiment, the threshold may be calculated without learning using known means such as regression analysis.

The display device 30 may comprise a second processor 31 and a display unit 33. The second processor 31 may comprise a display control section 32. The display control section 32 may be constituted as a program which is executable by the CPU. The display control section 32 has a function for controlling the display timing of the normal operation based on the threshold described above. The "normal operation" may be normal operation procedures, or may be normal operation results. The display unit 33 is constituted as a known display unit such as a liquid crystal display unit or a touch panel display unit. The display unit 33 displays information for supporting the operation in accordance with a command of the display control section 32, and in particular, displays the normal operation in accordance with the display timing of the display control section 32. The display unit 33 may be constituted by augmented reality equipment, and in this case, the normal operation is displayed superimposed on an image of real space.

Figure 2:
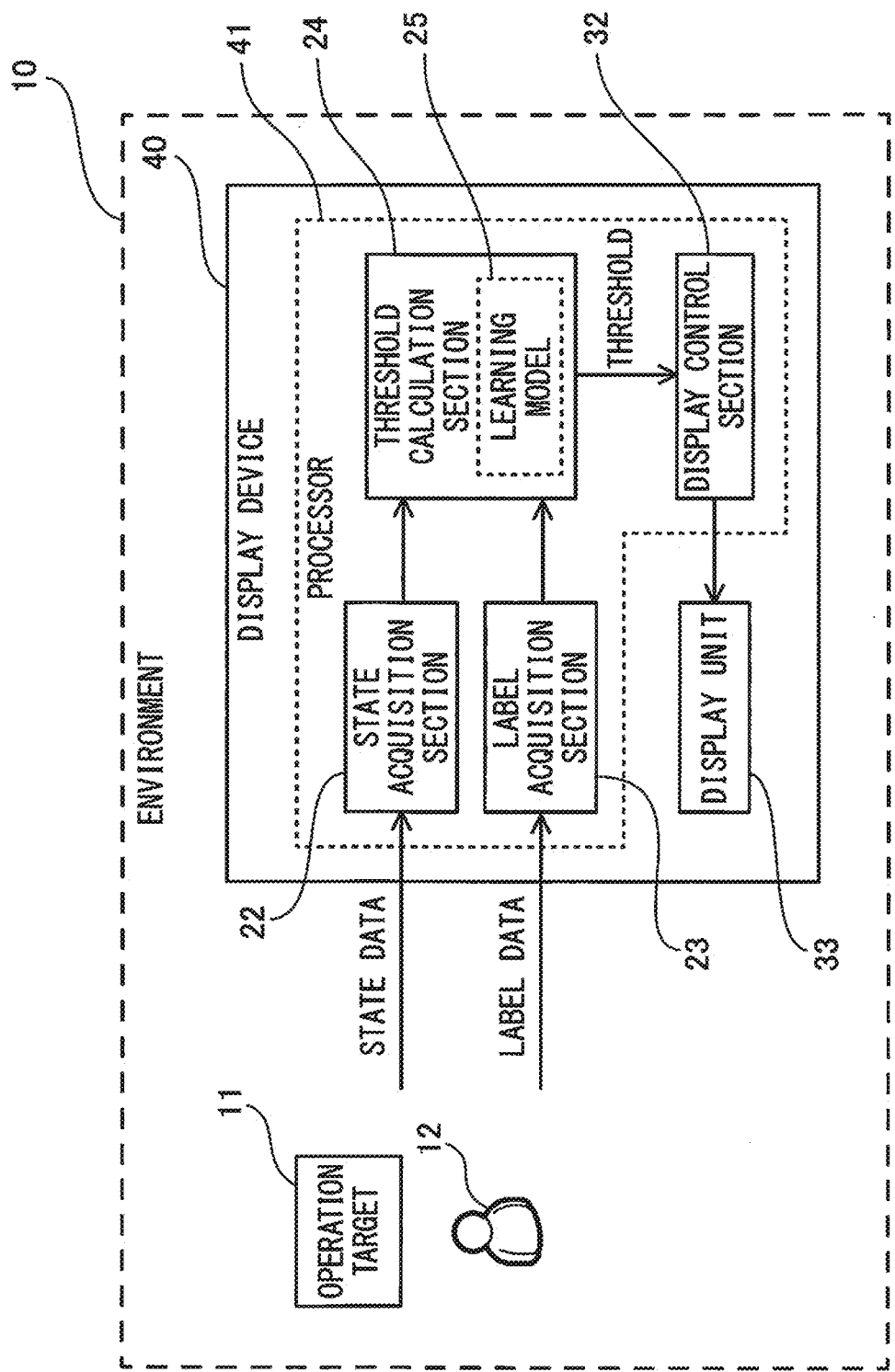
FIG. 2 is a block diagram of the display device according to another embodiment.

FIG. 2 is a block diagram of a display device 40 according to another embodiment. The display device 40 combines the functionality of the machine learning device 20 and the ability to operate independently. The display device 40 comprises a processor 41 and a display unit 33. The processor 41 is constituted as a known processor such as an ASIC, FPGA, or CPU. The processor 41 has substantially both a function to calculate, based on various data acquired from the environment 10, a threshold for determining whether or not an operation is likely to become abnormal, and a function to control display timing of the normal operation based on the threshold. The processor 41 comprises the aforementioned state acquisition section 22, label acquisition section 23, threshold calculation section 24, and display control section 32. The state acquisition section 22, label acquisition section 23, threshold calculation section 24, and display control section 32 may be constituted as programs which are executable by the CPU.

Figure 3:
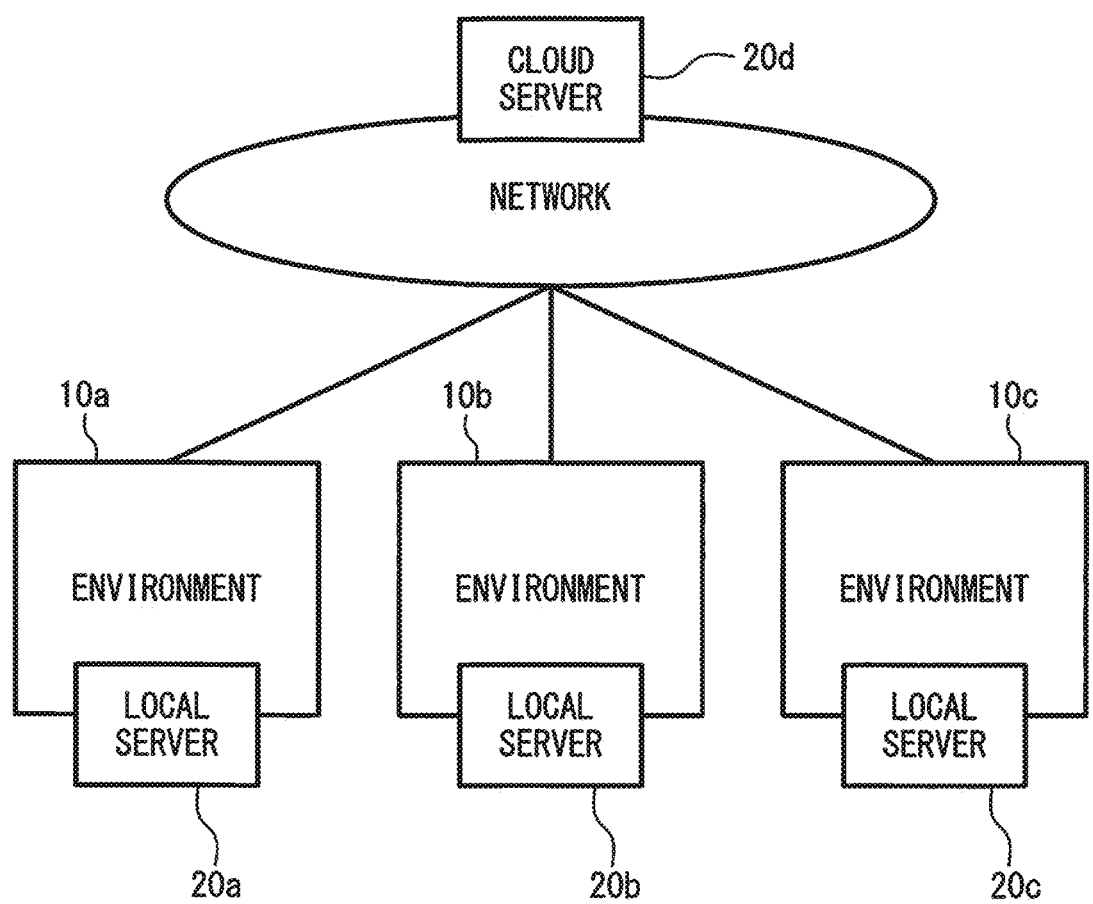
FIG. 3 is a block diagram of the display device according to yet another embodiment.

FIG. 3 is a structural view of the display system 1 according to yet another embodiment. The environment may include a plurality of environments, such as, for example, environments 10a to 10c, rather than a single environment. Furthermore, individual machine learning devices as described above may be present in the respective environments 10a to 10c, or a single machine learning device may be present on a network. In other words, the machine learning device may be constituted as local servers 20a to 20c which are present in or around the environments 10a to 10c, or alternatively, the machine learning device may be constituted as a cloud server 20d arranged remotely from the environments 10a to 10c. Further, the aforementioned state acquisition section, label acquisition section, and threshold calculation section may be arranged in the local serves 20a to 20c, or may be arranged in the cloud server 20d on the network. Additionally, the aforementioned learning model may be modeled and shared on the network for each operation.

An example of the learning model 25 will be described. Formula 1 is an example of a function that models the relationship between an abnormal operation flag F and state data A, B, C, and D. The abnormal operation flag F represents whether or not the operation to be performed is likely to become abnormal. The state data A, B, C, and D represent the aforementioned operation contents, operator information, operation time length, and operation date and time, respectively. a0, b0, c0, and d0 represent the weight of the operation contents, the weight of the operator information, the weight of the operation time length, and the weight of the operation date and time, respectively. The initial values of the weights are determined by regression analysis or the like after a predetermined amount or more of state data and the like has been accumulated. Though formula 1 is a linear function for predicting the abnormal operation flag from the state data, modelling may be carried out as a non-linear function. Furthermore, a constant e0 may be added to the right side of formula 1.

[Formula 1]

$$F = A \cdot a0 + B \cdot b0 + C \cdot c0 + D \cdot d0 \qquad 1$$

Formula 2 is an example of a function that models the relationship between weights l1 and l2 of the label data and weights a0, b0, c0, and d0 of the state data. Weight l1 of the label data represents the weight of the normal operation label data L1, and weight l2 of the label data represents the weight of the abnormal operation label data L2. a1, b1, c1, and d1 represent the weights of the state data at L1 acquisition timing and a2, b2, c2, and d2 represent the weights of the state data at L2 acquisition timing.

[Formula 2]

$$a1 = a0 \cdot l1, \; b1 = b0 \cdot l1, \; c1 = c0 \cdot l1, \; d1 = d0 \cdot l1$$

$$a2 = a0 \cdot l2, \; b2 = b0 \cdot l2, \; c2 = c0 \cdot l2, \; d2 = d0 \cdot l2 \qquad 2$$

Formula 3 is functions that model the relationship between the abnormal operation flag F of L1 acquisition timing and L2 acquisition timing and the threshold X. Y represents the threshold when the previous label data was acquired, and the initial value of Y may be 0. As illustrated by formula 3, the threshold X is increased at L1 acquisition timing, and the threshold X is decreased at L2 acquisition timing. As a result, each time the state data and label data are acquired, the threshold X is updated. Formulas 1 to 3 are executed by the aforementioned threshold calculation section 24.

[Formula 3]

L1 Acquisition Timing $$X = Y + (A \cdot a1 + B \cdot b1 + C \cdot c1 + D \cdot d1)$$

L2 Acquisition Timing $$X = Y - (A \cdot a2 + B \cdot b2 + C \cdot c2 + D \cdot d2) \qquad 3$$

Figure 4:
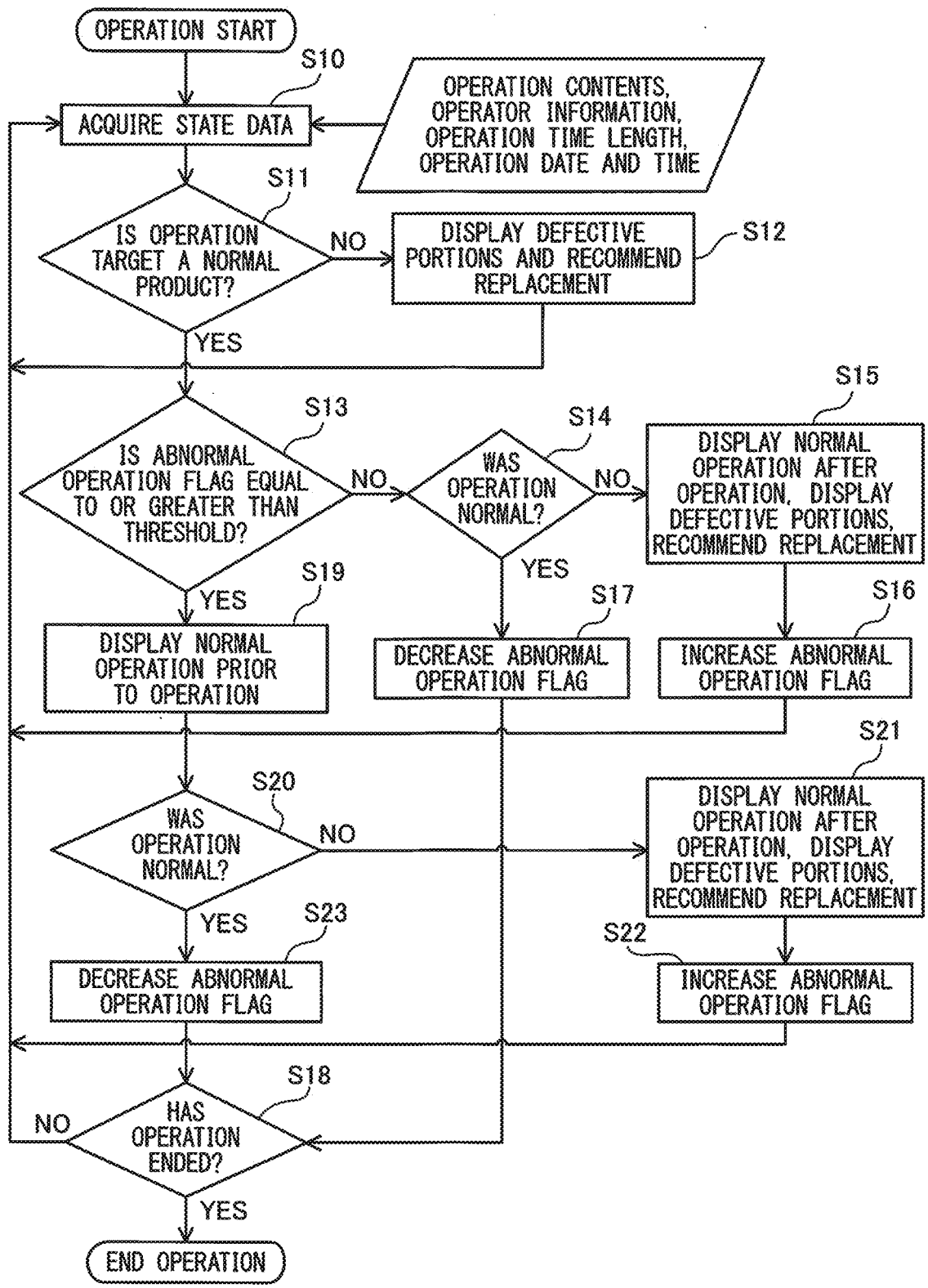
FIG. 4 is a flowchart showing an example of the operations of the display system or display device.

Formula 4 is a function for determining whether or not an operation to be performed is likely to become abnormal. As illustrated by formula 4, when the abnormal operation flag F is equal to or greater than the threshold X, since the operation is likely to become abnormal, the normal operation is displayed prior to operation. Conversely, when the abnormal operation flag F is less than the threshold X, since the operation is unlikely to become abnormal, the normal operation is displayed only when the performed operation was not normal. FIG. 4 is executed by the aforementioned display control section 32.

[Formula 4]

When $F \geq X$

Display Normal Operation Prior to Operation

When $F < X$

Do Not Display Normal Operation

Prior to Operation $\qquad 4$

FIG. 4 is a flowchart showing an example of the operation of the display system 1 or display device 40. In step S10, state data is acquired. The state data includes, in addition to operation contents, the operator information, the operation time length, and the operation date and time. When the state data is acquired, the threshold described above is updated.

In step S11, it is determined whether or not the operation target 11 is a normal product. Whether or not the operation target 11 is a normal product is specified by image recognition or the like. For example, in the case of an assembly operation in which a component A and a component B are assembled with a component C, whether or not components A, B, and C are normal products is specified by comparing the three images of the components A, B, and C with respective reference data. In step S11, when the operation target 11 is not a normal product (NO in step S11), in step S12, the defective portion is displayed, and replacement is recommended. Next, the process returns to the operation start. In step 11, when the operation target 11 is a normal product (YES in step S11), the process proceeds to step S13.

In step S13, it is determined whether or not the operation to be performed is likely to become abnormal. In other words, it is determined whether the abnormal operation flag is equal to or greater than the threshold. When the operation is unlikely to become abnormal in step S13 (NO in step S13), in step S14, it is determined whether or not the operation was normal, and only in the case in which the operation was not normal (NO is step S14), in step S15, the normal operation is displayed, the defective portion is displayed, and replacement is recommended. As a result, the normal operation can be confirmed without disruption, even for skilled operators. Next, in step S16, the abnormal operation flag is increased, and the process returns to the operation start. In step S14, when the operation was normal (YES in step S14), in step S17, the abnormal operation flag is decreased, and in step S18, it is determined whether or not the operation has ended.

In step S13, when the operation to be performed is likely to become abnormal (YES in step S13), in step S19, the normal operation is displayed prior to operation. As a result, operation errors can be reduced even in the case of unskilled operators, complicated operations, long operation times, or long working hours or working days. In step S20, it is determined whether or not the operation was normal, and only in the case in which the operation was not normal (NO is step S20), in step S21, the normal operation is displayed again after the operation, the defective portion is displayed, and replacement is recommended. As a result, even if the operation is abnormal though the normal operation was displayed prior to operation, operation errors can be reduced. Next, in step S22, the abnormal operation flag is increased, and the process returns to the operation start. In step S20, when the operation was normal (YES in step 20), in step S23, the abnormal operation flag is decreased, and in step S18, it is determined whether or not the operation has ended.

In step S18, in the case in which the operation has not ended (NO in step S18), the process returns to the operation start, and when the operation has ended (YES in step S18), the process ends.

According to the embodiments above, since the threshold data is updated each time state data and label data are acquired, the prediction accuracy as to whether or not the operation to be performed is likely to become abnormal increases over time. Since the display timing of the normal operation is controlled in accordance with such a threshold, operation errors can be reduced without disturbing the operator due to the display of the normal operation.

The program for executing the aforementioned flowchart may be stored and provided on a computer readable non-transitory recording medium such as, for example, a CD-ROM.

Though various embodiments have been described in the present specification, the present invention is not limited to the embodiments described above, and it can be recognized that various modifications can be made within the scope described in the claims below.

The invention claimed is:

1. A display system, comprising:
   a state acquisition section which acquires state data including at least operation contents,
   a label acquisition section which acquires label data representing whether or not an operation performed when the state data is acquired is abnormal,
   a threshold calculation section which calculates, based on the state data and the label data, a threshold for determining whether or not an operation to be performed is likely to become abnormal,
   a display control section which controls display timing of a normal operation based on the threshold, and
   one or a plurality of display units configured to display the normal operation according to the display timing.

2. The display system according to claim 1, wherein the threshold is updated based on a learning model using the state data and the label data as teaching data.

3. The display system according to claim 1, wherein the state data further includes at least one of operator information, an operation time length, and an operation date and time.

4. The display system according to claim 2, wherein the learning model is shared between the plurality of display units.

5. The display system according to claim 1, wherein the display unit is constituted by augmented reality equipment.

6. The display system according to claim 1, wherein the display unit displays information for supporting an assembly operation.

7. The display system according to claim 1, wherein the state acquisition section, the label acquisition section, and the threshold calculation section are arranged in a local server or in a cloud server.

8. The display system according to claim 2, wherein the learning model is modeled for each operation and shared on a network.

9. A machine learning device, comprising:
   a state acquisition section which acquires state data including at least operation contents,
   a label acquisition section which acquires label data representing whether or not an operation performed when the state data is acquired is abnormal, and
   a threshold calculation section which calculates, based on the state data and the label data, a threshold for determining whether or not an operation to be performed is likely to become abnormal, wherein
   the threshold is updated based on a learning model using the state data and the label data as teaching data.

10. The machine learning device according to claim 9, wherein the learning model is modeled for each operation and shared on a network.

11. A display device, comprising:
    a state acquisition section which acquires state data including at least operation contents,
    a label acquisition section which acquires label data representing whether or not an operation performed when the state data is acquired is abnormal,
    a threshold calculation section which calculates, based on the state data and the label data, a threshold for determining whether or not an operation to be performed is likely to become abnormal,
    a display control section which controls display timing of a normal operation based on the threshold, and
    a display unit configured to display the normal operation according to the display timing.

12. A display system, comprising:
at least one processor configured to:
- acquire state data including operator information and operation contents,
- acquire label data representing whether or not an operation performed when the state data is acquired is abnormal,
- calculate, based on the state data and the label data, a threshold for determining whether or not an operation to be performed is likely to become abnormal, and
- control display timing of a normal operation based on the threshold, and at least one display unit configured to display the normal operation according to the display timing, wherein
the operator information includes information representing a proficiency of an operator performing an operation, and
the operation contents include an operation difficulty level.

* * * * *